United States Patent [19]
Costa et al.

[11] Patent Number: 5,054,282
[45] Date of Patent: Oct. 8, 1991

[54] DRAIN ASSEMBLY

[75] Inventors: Mark W. Costa, Storrs, Conn.; Steven P. Shach, Randalls Town, Md.

[73] Assignee: United Technologies Corporation, Hartford, Conn.

[21] Appl. No.: 316,901

[22] Filed: Feb. 28, 1989

[51] Int. Cl.5 .................. F02G 3/00; B65D 51/16
[52] U.S. Cl. .................... 60/39.094; 220/374
[58] Field of Search .......... 60/39.094, 39.08, 39.11; 184/6.11; 220/373, 374, 674

[56] References Cited

U.S. PATENT DOCUMENTS

| | | | |
|---|---|---|---|
| 1,310,241 | 7/1919 | Kessler | 220/88 A |
| 1,724,346 | 8/1929 | Ford | 220/303 |
| 1,865,319 | 6/1932 | Jensen | 220/373 |
| 1,960,259 | 5/1934 | Wyman | 98/1 |
| 2,241,085 | 5/1941 | Garratt | 220/373 |
| 2,297,830 | 10/1942 | Hardage | 222/451 |
| 2,446,013 | 7/1948 | Kuyper | 60/39.094 |
| 3,199,716 | 8/1965 | Price | 220/303 |
| 3,356,255 | 12/1967 | Zavertnik et al. | 220/88 A |
| 3,841,520 | 10/1974 | Bryant et al. | 220/88 A |
| 4,163,366 | 8/1979 | Kent | 60/39.094 |
| 4,387,829 | 6/1983 | Berry | 220/374 |

Primary Examiner—Louis J. Casaregola
Assistant Examiner—Timothy S. Thorpe
Attorney, Agent, or Firm—Gene D. Fleischhauer

[57] ABSTRACT

A drain assembly 30 for a case 26 is disclosed. Various construction details are developed for minimizing the radial profile and facilitating assembly to an opening in the case while blocking the passage of flames from the exterior to the interior. In one embodiment, the drain assembly 30 has a cover 42 facing one side of the case with passages 48 therethrough, a plate 58 having a passage 62 on the other side of the case, and a baffle 66 disposed in the opening to block flames from passing between the cover side of the case and the plate side of the case.

10 Claims, 3 Drawing Sheets

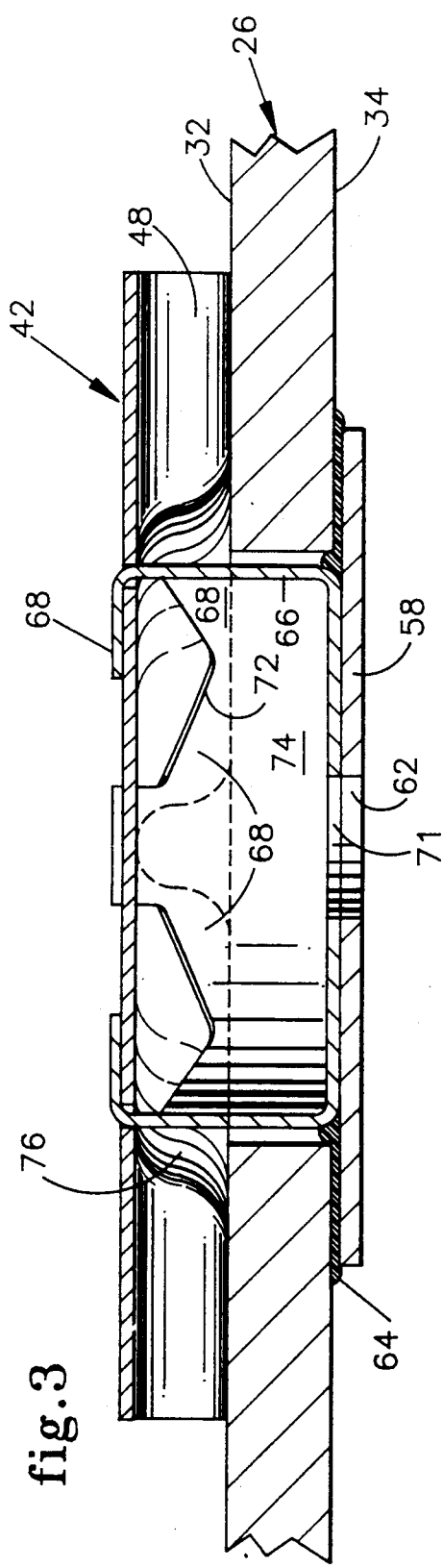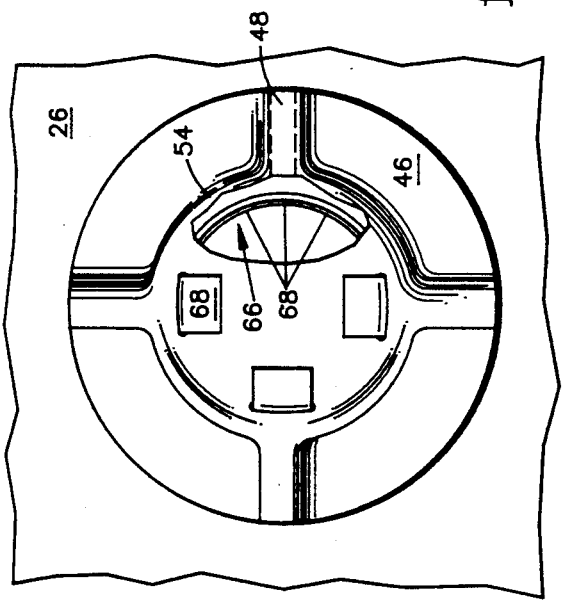

DRAIN ASSEMBLY

TECHNICAL FIELD

This invention relates to axial flow, gas turbine engines and more particularly to a drain assembly for the case of such an engine. This invention was developed in the field of aircraft gas turbine engines and has application to other structures employing a drain assembly.

BACKGROUND OF THE INVENTION

One example of a gas turbine engine is a turbofan, gas turbine engine of the type used to propel aircraft. The turbofan engine has a primary flowpath for working medium gases which is annular in shape. The annular flowpath extends through a compression section, a combustion section, and a turbine section. The engine has a rotor assembly which extends axially through these sections of the engine. A stator assembly, which includes an engine case, extends axially through the engine outwardly of the rotor assembly to bound the working medium flowpath and to support the rotor assembly of the engine.

A secondary flowpath for working medium gases is annular in shape and extends axially rearward through the engine outwardly of the primary flowpath. The stator assembly includes a portion of the engine case which provides an inner boundary to the secondary flowpath and a portion of a fan duct which provides an outer boundary to the flowpath.

During engine operation, fuel is supplied to the combustion section where it is burned to produce energy. The energy is used to develop a propulsive thrust and to drive the rotor assembly about an axis of rotation. Hydraulic and lubricating fluids are supplied to other sections of the engine for hydraulic actuators and for lubricating moving components.

The fuel, hydraulic and lubricating systems may develop small, intermittent leaks which occur during engine operation. As a result, fluids may accumulate at very low rates at the bottom of the engine on the interior of the engine case. Because these fluids are flammable, it is desirable to drain the fluids via an opening in the engine case into the secondary flowpath. The large volume of rushing gases in the secondary flowpath sweeps away any small amount of fluid draining from the case during engine operation at a flammable fluid to air ratio which does not support combustion.

One disadvantage of a drain opening is that the opening provides a path for flames to the inside should a fire occur outside the engine or a path for flames to the outside should a fire occur on the inside of the engine. Accordingly, it is desirable to provide a device for draining fluids from the case that blocks flames from passing through the device from the inside of the case to the outside or from the outside to the inside.

One example of a device which might be used in other fields is shown in U.S. Pat. No. 1,960,259 entitled "Safety Device" which was issued to Wyman. In the Wyman construction, a plug threadably engages a case. The case has an axially extending inlet passage, an axially extending outlet passage, and an axially extending apparatus for blocking flames which extends from the inlet to the outlet passage. The apparatus includes a number of axially spaced disks. Each disk has a chordal segment cut away to provide an opening which axially faces the adjacent disks. This forms a tortuous path from the inlet to the outlet which is easily followed by the draining fluid while providing an effective device for blocking the passage of flames.

It is important in gas turbine engines to avoid using a drain assembly which intrudes into the secondary flowpath because the intrusion disrupts the flow in the secondary flowpath with a concomitant decrease in aerodynamic performance. In addition, it is important to minimize how far the device extends into the engine interior because of close clearances between the engine case and structures on the interior of the engine. The clearances are kept close to minimize the radial profile of the engine which decreases drag on the engine during operative conditions.

Accordingly, scientists and engineers working under the direction of Applicants, assignee are working to develop a drain assembly for an engine case, which has a low profile to fit in the clearance between the engine case and structure inwardly of the engine case, and which allows fluids to freely flow from the interior while providing a barrier to flames.

DISCLOSURE OF THE INVENTION

According to the present invention, a drain assembly having a chamber for collecting fluid prior to discharge has a first passage and a second passage which are perpendicular to each other, a baffle between the passages which blocks the one of the passages from line of sight communication with the chamber and a manifold which extends laterally with respect to one of the passages to provide a passage for fluid and a tortuous path for flame.

In accordance with one embodiment of the present invention, the drain assembly extends through an opening in the engine case of a gas turbine engine and includes a cover on one side of the case bounding the inlet passage and a plate on the other side of the case bounding the outlet passage; the cover and plate are urged toward the case by the baffle with a resilient compound disposed between the drain assembly and the case to provide sealing and to damp vibrations in the drain assembly.

In accordance with one detailed embodiment of the present invention, the inlet has a plurality of inlet passages and the baffle has a plurality of tabs which extend outwardly at each inlet passage to block line of sight communication with the chamber and to engage the cover to urge the cover toward the engine case.

A primary feature of the present invention is a drain assembly for an opening having a cover on one side of a structure, (such as a engine case for a gas turbine engine) and a plate on the other side of the structure leaving a drain chamber therebetween. Another feature is a baffle disposed in the opening between the cover and the plate to bound the drain chamber. In one embodiment, the baffle extends laterally to block line of sight communication between an inlet passage and the drain chamber. Another feature is a manifold between the cover and the baffle which extends from the inlet passage to the drain chamber. In a more detailed embodiment, the baffle is attached to the plate and is attached to the cover to urge the cover and the plate toward the engine case. The baffle has a plurality of tabs which extend through the cover and are bent over during assembly to retain both the plate and the cover. Another feature is a resilient material disposed between the drain assembly and the engine case.

A principal advantage of the present invention is the low profile of a flame proof drain assembly for a case which results from the plate and cover construction with the cover having passage for fluid which extends parallel to the case. Another advantage is the ease of fabricability resulting from the use of a simple three element structure to provide a flameproof drain to an opening in a case. Still another advantage is the simplicity of the structure and the ability of the structure to adapt to casings having different thicknesses. In one detailed embodiment, an advantage the fatigue life of the structure which results from using sealing material to reduce vibrations in the drain assembly.

The foregoing features and advantages of the present invention will become more apparent in light of the following detailed description of the best mode of carrying out the invention and in the accompanying drawings.

BRIEF DESCRIPTION OF DRAWINGS

FIG. 3 is a side elevation cross-sectional view of the engine case and the drain assembly.

FIG. 4 is a view from above of the drain assembly shown in FIG. 3 with a portion of the cover broken away to show an inlet passage and a portion of a baffle.

BEST MODE FOR CARRYING OUT THE INVENTION

Figure 1:
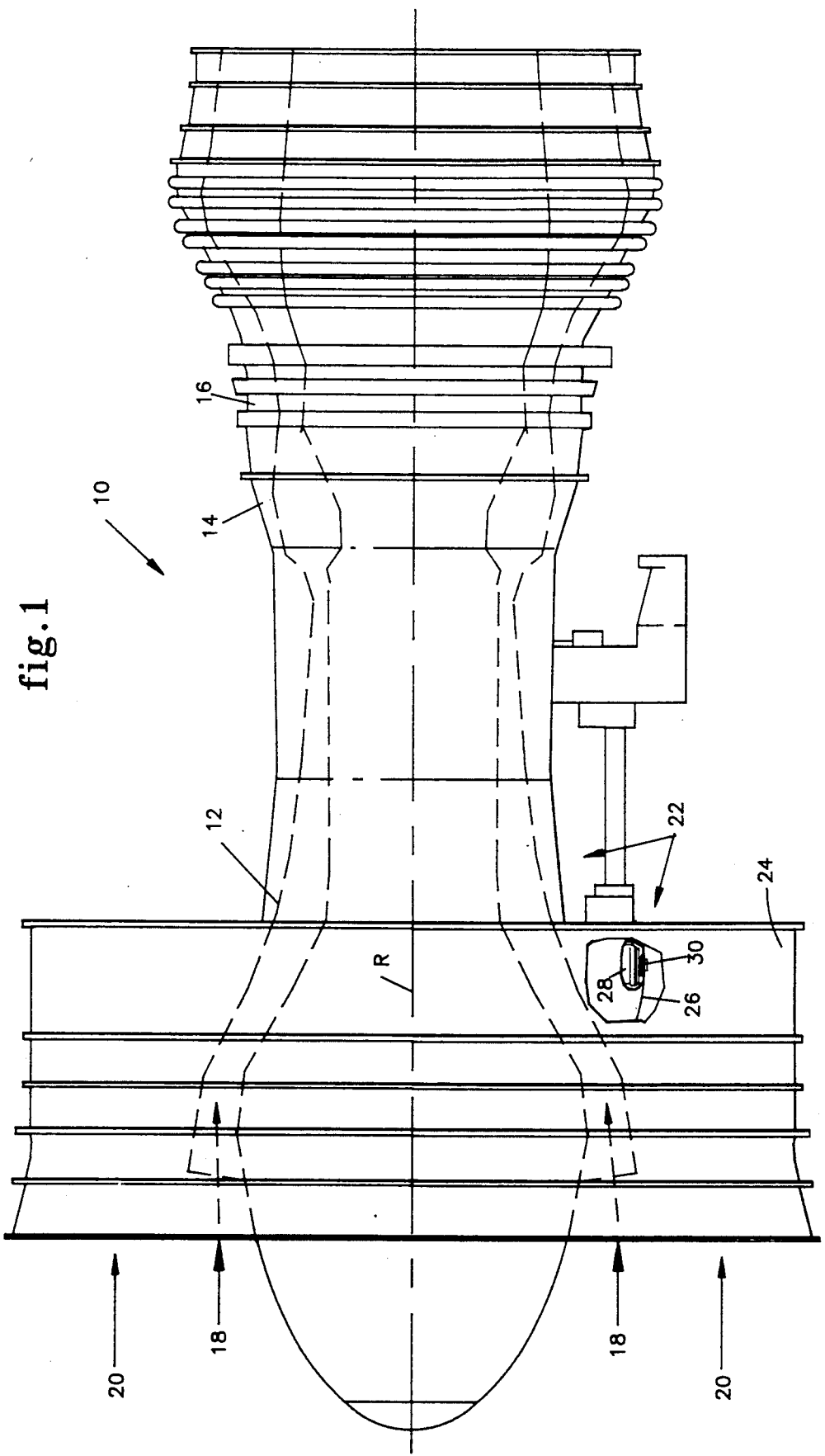
FIG. 1 is a side elevation view of an axial flow, gas turbine engine with a portion of the fan duct broken away to show a secondary flowpath and a portion of a drain assembly.

FIG. 1 is a side elevation view of a turbofan gas turbine engine 10 which has axis of rotation R. The engine has a compression section 12, a combustion section 14, and a turbine section 16. An annular flowpath 18 for primary working medium gases extends axially through the sections of the engine. A portion of the flowpath is shown by the dotted lines. A secondary flowpath 20 for working medium gases extends axially through the engine outwardly of the primary flowpath.

A stator assembly 22 extends axially through the engine to bound the secondary flowpath. The stator assembly includes a fan duct 24 and an engine case 26. A case is any protective covering, sheath or housing whether on the interior of a structure or not. The engine case 26 is closely adjacent to internal structure 28 to minimize the radial profile of the engine case. For example, the clearance between the structure and the engine case might be as small as one-half of an inch (0.50"). A drain assembly 30 is disposed between the internal structure and the bottom of the engine case. The drain assembly places the interior of the engine case in flow communication with the secondary flowpath for working medium gases 20. The drain assembly is exaggerated in size for clarity.

Figure 2:
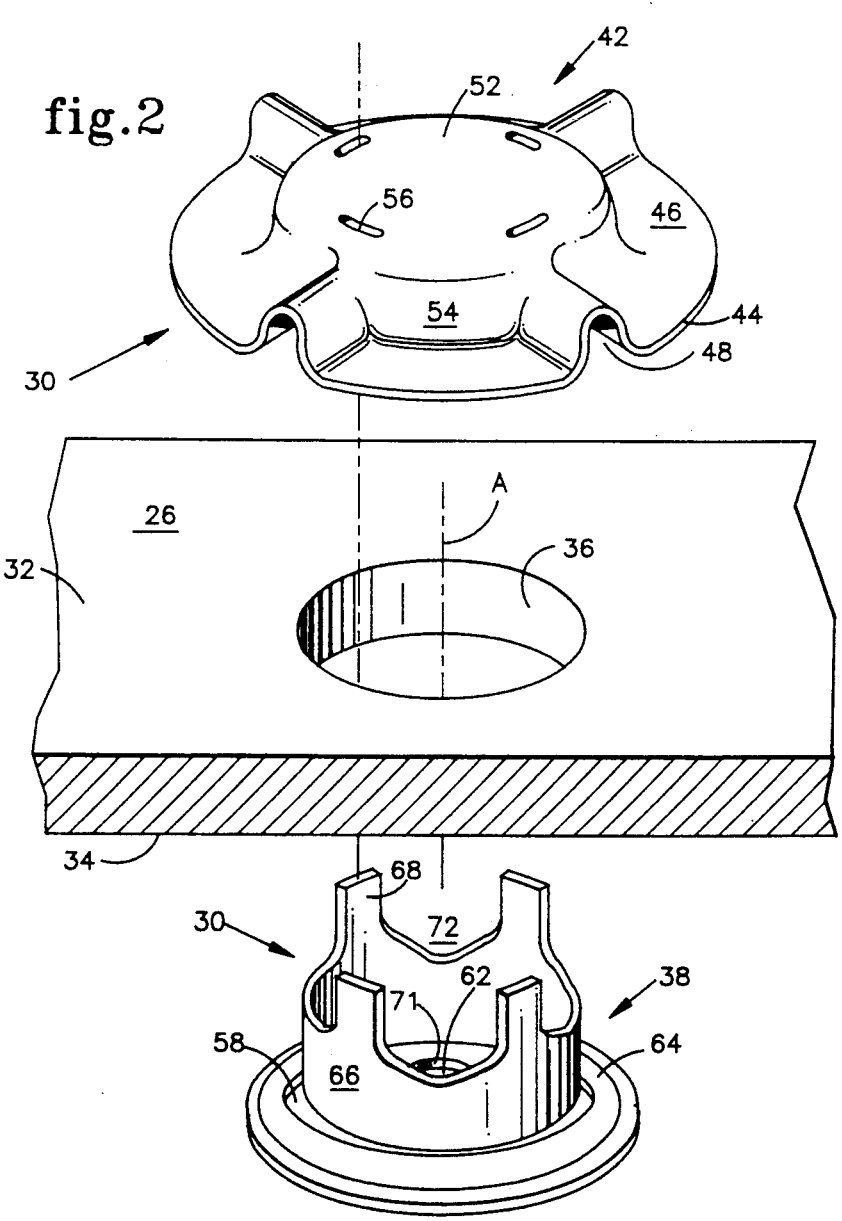
FIG. 2 is a partial perspective view of a portion of the engine case and an exploded perspective view of the drain assembly.

FIG. 2 is a partial perspective view of the engine case 26 and an exploded view of the drain assembly 30. The engine case 26 has a first side 32 facing the interior of the engine case and a second side 34 facing the secondary flowpath. A drain opening 36 in the engine case extends between the first side and the second side. The opening is cylindrical and is disposed about the axis A. The opening might be cylindrical, rectangular or any other shape in which case the axis A would be equally spaced from opposite surfaces extending through the engine case. The drain assembly may be formed of any ductile, corrosion resistant material which is compatible with the adjacent environment. One material which is acceptable is a stainless steel alloy as set forth in Aerospace Material Specification (AMS) 5510.

The drain assembly 30 includes a cylindrical plug assembly 38 and a circular cover 42. The circular cover has a circular edge 44. A rim section 46 extends circumferentially about the cover and inwardly from the edge. The rim section engages the first side of the engine case. The rim section includes a plurality of (that is, two or more) inlet passages 48 which extend parallel to the case. The inlet passages are spaced circumferentially one from the other and extend radially inward from the edge. The inlet passages are bounded in part by the inside case. Not using additional cover material to bound the passage at this location reduces the radial height of the drain assembly. In alternate constructions, the cover might entirely bound the inlet passages, especially where radial height is not of significant importance.

The rim section 46 includes a raised central section 52. A wall 54 extends axially inward to the rim section and circumferentially between the inlet passages. The raised central section includes four circumferentially extending slots 56 which are each circumferentially aligned with an associated inlet passage 48.

The cylindrical plug assembly 38 has a plate 58 facing the second side 34 of the engine case. The plate has an outlet passage 62 which extends in a direction which is substantially perpendicular to the inlet passage 48. A resilient seal member 64 extends circumferentially about the outlet passage and disposed between the plate and the engine case. The resilient seal member is formed of an adhesive/sealant such as a flame resistant, silicone rubber. One suitable material is DAPCOCAST No. 18-4 which is available from D Aircraft Products, Inc., Anaheim, Calif. 92807.

The cylindrical plug assembly 38 includes an integral baffle member 66 having an opening 71 in flow communication with the opening 62. The baffle is attached to the plate 58 by brazing or any other suitable bonding technique or by mechanical fasteners such as screws, rivets, or any other suitable fastener. In some embodiments, the baffle member may not be attached to the plate 58 or it may be formed as one piece with the plate. Each baffle member has a plurality of tabs 68. Each tab extends axially from the baffle and is aligned with an associated hole 56 in the cover. The tabs are circumferentially spaced one from the other leaving an opening 72 therebetween.

FIG. 3 is a side elevation, cross-sectional view of the drain assembly 30 shown in FIG. 2 in the assembled condition. The drain assembly has a drain chamber 74 disposed on the interior of the assembly. The drain chamber extends between the cover 42 and the plug assembly 38. The baffle 66 bounds the drain chamber.

As shown in FIG. 3, each tab 68 of the baffle is circumferentially aligned with and radially faces an associated inlet passage 48 of the cover. The tab extends axially through the cover and is bent over in the assembled condition to attach the baffle and the plate to the cover. The tab 68 extends laterally with respect to the inlet passage and to the wall 54 to block line of sight communication from the inlet passage to the drain chamber 74. The tab is spaced radially from the wall leaving a circumferentially or laterally extending manifold 76 between the wall and the baffle. The opening 72 between each pair of tabs is not radially aligned with the inlet passage and places the manifold in flow communication with the drain chamber 74.

As shown in FIG. 3, the resilient, elastomeric material 64 is compressed during assembly and provides a seal between the baffle 66 and the opening 36 in the wall of the case. The baffle is preferably formed of a diameter slightly smaller than the opening 36 to minimize the gap G between the baffle and the opening. The gap G is exaggerated for clarity. As will be realized, the resilient material might extend directly between the baffle and the opening in those embodiments where the gap G would permit the resilient material to extend into that location. In addition, the resilient material might be disposed between the cover and the first side of the case for additional damping but this would add to the radial height of the construction. Alternatively, the drain assembly might be oriented so that the cover is disposed on the outside 34 of the case and the plate disposed in the inside of the case.

FIG. 4 is a top view of the cover 42 shown in FIG. 2 and FIG. 3 showing the relationship of the baffle 66 and its tab 68 to the wall 54 and the inlet passage 48 in the cover. As shown, the tab 68 radially faces and is circumferentially aligned with the inlet passage 48.

Figure 5:
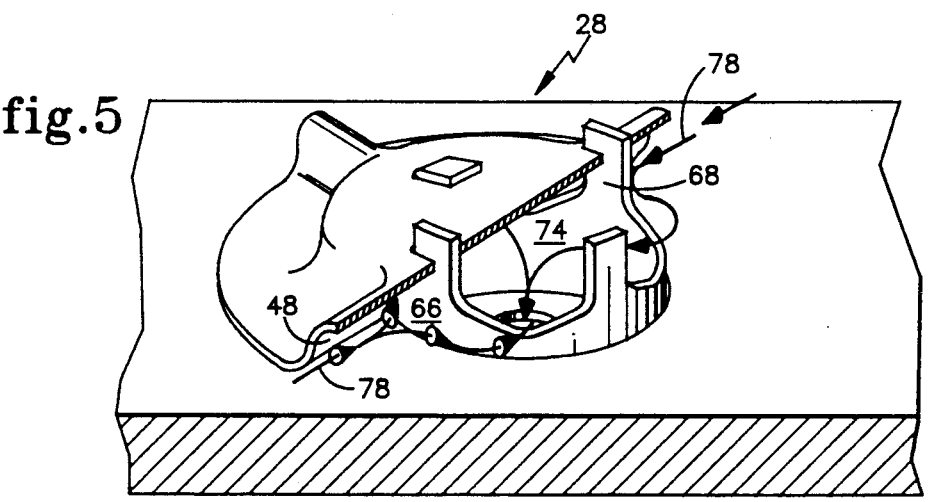
FIG. 5 is a partial perspective view in schematic fashion showing the relationship of the structure to a flowpath for draining fluid which extends through the drain assembly.

FIG. 5 is a partial perspective view of the drain assembly 28 shown in FIG. 2 showing the relationship of the flowpath 78 for drain fluid, each of which extends through an inlet passage 48 and the opening 72 between the adjacent tabs 68. As can be seen, each flowpath enters parallel to the engine casing, is diverted laterally by the baffle, enters the drain chamber 74 where it makes a right angle turn toward the openings 62,71 in the baffle and the plate which form the outlet passage for the plug assembly. The flowpaths 78 extend through the openings into the secondary flowpath 20.

As shown by FIG. 5, the fluid follows a tortuous path through the drain assembly. The tortuous path prevents flames from either side of the case from passing through the drain assembly. In the unlikely event that a fire does occur in the engine case, and there is fluid draining from the engine case, the low radial height of the cover and the inlet passages ensures that the inlet passages are covered with fluid. In addition to the path through the drain providing a flameproof barrier by reason of the inability of the flame to change directions, the fluid flowing through the drain which fills the drain will further block the flames from passing through the case.

An advantage is the ease of fabricability which results from using a two piece assembly by forming the baffle and plate as a single unitary plug assembly. During construction of the engine, this permits inserting the core assembly through the opening 36 in the case. The cover 42 is disposed on the other side of the case. Each tab 68 engages an associated opening 56 in the cover 42. The tabs are bent over to secure the baffle to the cover, compressing the resilient silicone, elastomeric material between the plate and the engine case. The tabs alone allow the drain assembly to accommodate different thicknesses of the engine case while still permitting the drain assembly to provide a baffled flowpath.

Another advantage is the simplicity of forming the components of the structure which results from combining the retention device with the baffle in a single device by having the tabs extend radially outward at a location where the tabs interrupt line of sight communication between the inlet passage 48 and the drain chamber 74.

Although the invention has been shown and described with respect to detailed embodiments thereof, it should be understood by those skilled in the art that various changes in form and detail thereof may be made without departing from the spirit and scope of the claimed invention:

We claim:

1. A drain assembly for a structure having a case which has a first side, a second side and a drain opening which extends axially through the case, which comprises:

a cover for the opening which faces the first side of the case, the cover having at least one first passage bounded by the cover which is in flow communication with the drain opening, the first passage having at least a portion of the passage which extends in a first direction parallel to the first side;

a plate which faces the second side of the case, the plate having a second passage in flow communication with the opening, the second passage having a portion which extends in a direction which is substantially perpendicular to the first direction, the plate being attached to the cover to urge the cover and the plate toward the case such that the plate, the cover and the opening are disposed about a drain chamber;

a baffle disposed in the opening and between the cover and the plate, the baffle extending laterally with respect to the first passage to block line of sight communication between the first passage and the drain chamber, the baffle being spaced from the cover to form a manifold between the cover and the baffle and having an opening spaced from the first passage which places the manifold in flow communication with the drain chamber, the manifold extending laterally with respect to the first passage and the drain chamber from the first passage to the opening to place the first passage in flow communication with the second passage via a tortuous passage which permits the passage of fluid in either direction but blocks the passage of flame.

2. The drain assembly as claimed in claim 1 wherein a flowpath for drain fluid extends through the case from the first side to the second side and extends through the first passage to the second passage and wherein the first passage is an inlet passage and the second passage is an outlet passage.

3. The drain assembly as claimed in claim 1 wherein the case is an engine case for a turbofan gas turbine engine having a secondary flowpath and the plate is adjacent the secondary flowpath with the outlet passage in flow communication therewith.

4. The drain assembly as claimed in claim 2 wherein the case is an engine case for a turbofan gas turbine engine having a secondary flowpath and the plate is adjacent the secondary flowpath with the outlet passage in flow communication therewith.

5. The drain assembly as claimed in claim 1 wherein a resilient material is disposed between the drain assembly and the engine case to provide a damping structure to the drain assembly.

6. The drain assembly as claimed in claim 5 wherein the resilient material is disposed between the plate and the engine case and provides a circumferentially extending seal between the plate and the engine case.

7. The drain assembly as claimed in claim 1 wherein the baffle is attached to the plate and to the cover.

8. The drain assembly as claimed in claim 1 wherein the baffle has at least two tabs, each of which engages the cover to attach the cover to the baffle and each of which is radially spaced from an associated first passage and is axially and circumferentially aligned with respect to said passage, and extends laterally with respect to said passage to block line of sight communication with the drain chamber and to bound a portion of said manifold which extends to the drain chamber.

9. For a gas turbine engine having an engine case, the engine case having a first side and a second side facing in opposite directions, a drain assembly disposed about an axis, which comprises:
   a circular cover which has a circular edge, the cover including
      a rim section which extends circumferentially about the cover, which extends inwardly from the edge, and which engages one side of the engine case, the rim section including a plurality of inlet passages bounded in part by the case which are spaced circumferentially one from the other and extend radially inward from the edge,
      a raised central section having a wall extending axially inward to the rim section, the wall extending circumferentially between the inlet passages; and,
   a cylindrical plug assembly having
      a plate facing the second side of the engine case, the plate having an outlet passage and being spaced axially from the cover leaving a drain chamber therebetween,
      a resilient seal member extending circumferentially about the outlet passage, the seal member being disposed between the plate and the case; and,
      a baffle member attached to the plate which has a tab radially facing each inlet passage and which extends axially through the cover, the baffle being spaced radially from the wall and the inlet passage and extending laterally with respect to the inlet passage and to the wall to block line of sight communication with the drain chamber and to form an annular manifold between the wall and the baffle, the baffle having an opening which is not aligned with an inlet passage to place the inlet passage in flow communication with the drain chamber via the manifold, the drain chamber being in flow communication with the outlet passage to provide a drain flowpath, wherein the inlet and outlet passages are perpendicular to each other and connected by a drain chamber without line of sight communication between the inlet passage and the drain chamber to provide a tortuous passage which blocks flames but permits the flow of fluid.

10. The drain assembly as claimed in claim 9 wherein the baffle urges the plate against the resilient seal member to form a seal between the plate and the second side of the engine case and to damp vibrations in the drain assembly, and wherein the baffle urges the cover against the first side of the engine case to mount the drain assembly to the case.

* * * * *